April 19, 1932.　　R. A. LIGHT ET AL　　1,854,994
SAND TRAP
Filed May 9, 1931
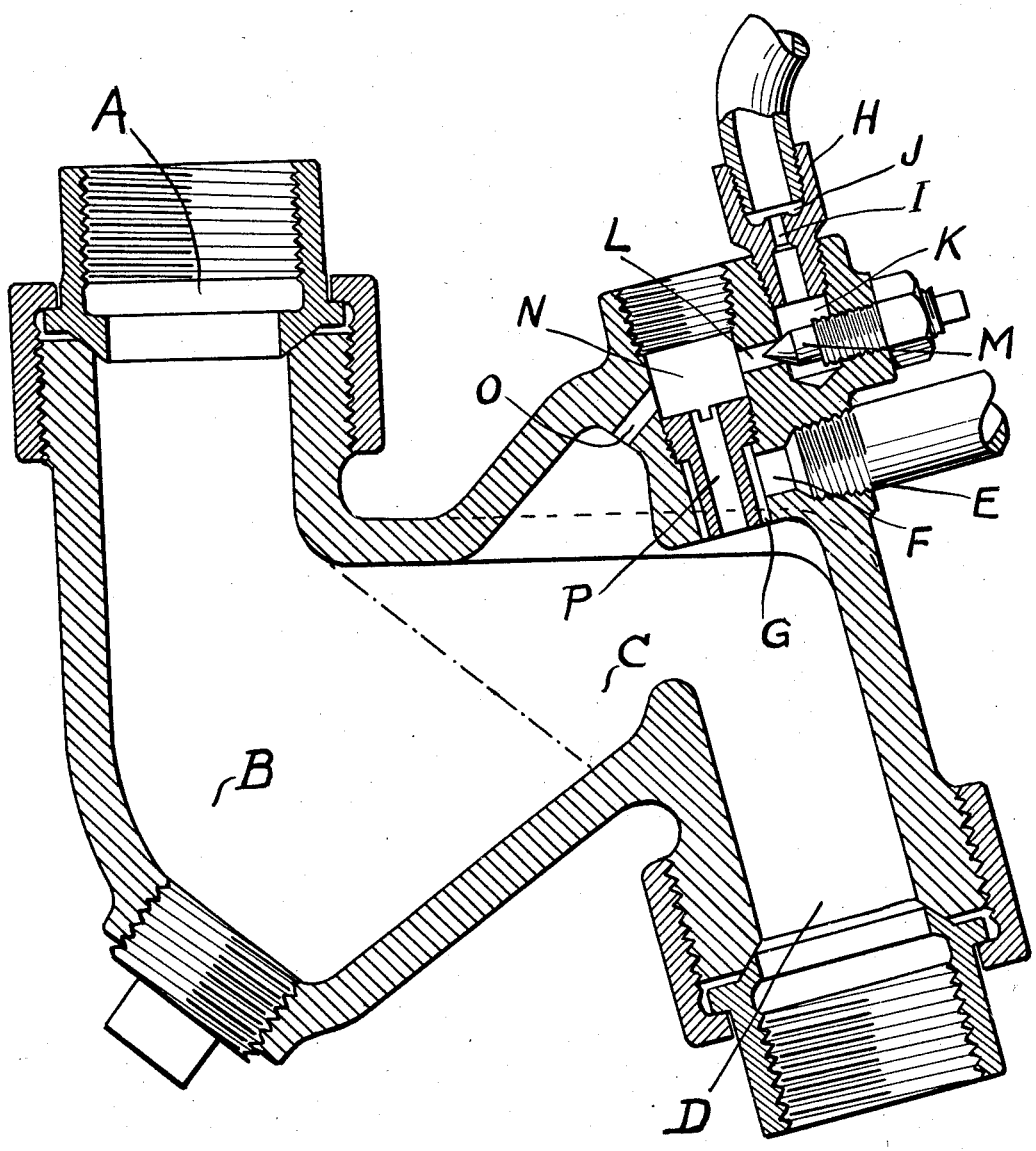
WITNESS:
Rob P. Litchel.
INVENTORS
Ralph A. Light &
Joseph W. Price Jr.
BY
Francis J. Chumans
ATTORNEY.

Patented Apr. 19, 1932

1,854,994

UNITED STATES PATENT OFFICE

RALPH A. LIGHT, OF CYNWYD, AND JOSEPH W. PRICE, JR., OF PHILADELPHIA, PENNSYLVANIA, ASSIGNORS TO THE UNITED STATES METALLIC PACKING COMPANY, OF PHILADELPHIA, PENNSYLVANIA, A CORPORATION OF PENNSYLVANIA

SAND TRAP

Application filed May 9, 1931. Serial No. 536,172.

Our invention relates to sand traps such as are used in connection with locomotive sander systems and of the type in which sand normally retained in the bowl of the trap is lifted out of the bowl by the action of a jet of air issuing through a nozzle directed into the bowl. More particularly, though not exclusively, our invention relates to sand traps of the general construction described in our Patent No. 1,800,548, granted April 14, 1931. In sand traps of the general character described both the velocity and volume of the air injected into the trap function in the delivery of the sand from the bowl of the trap to the discharge opening. The velocity of the jet plays an important function in lifting a portion of the sand out of the mass contained in the bowl and the volume of air also functions in carrying the sand out of the bowl and into the delivery opening, and for the efficient and economical working of the trap it is found that the air delivered into the bowl must be nicely regulated both as to velocity and volume. Where air is supplied from a reservoir in which an approximately constant pressure is maintained it is found comparatively easy to regulate both the velocity and volume of the air jet but in practice it is found that the air pressure in the reservoirs of different locomotives varies quite widely and that it is a matter of some difficulty to regulate the velocity and volume of air jets drawing their supply from reservoirs in which the air is carried at considerable variation in pressure and the object of our invention is to provide a sand trap with devices for regulating the velocity and volume of the air jet which will function better than previously used constructions under variations of reservoir pressure.

In traps constructed as shown in our prior patent a restricted passage is formed in the trap through which the air coming through a pipe leading from the air reservoir is delivered to the nozzle directed into the bowl of the trap and provision is made for regulating the effective area of this passage by means of a needle valve. As shown in the drawing of our former patent, the air passing the regulable restricted passage is divided and part of it delivered to a nozzle directed into the discharge end of the trap. Our improvement consists in providing the trap with a second restricted or choke passage directly connectible with the air supply pipe and opening into an air expansion chamber from which in turn a restricted passage preferably regulable in effective area leads to the air nozzle or nozzles preferably through a second expansion chamber to which the nozzles are directly connected. Another feature of our invention lies in providing around the entering end of the choke passage with which the air pipe connects a depressed gutter adapted to receive and retain particles of dirt which may be carried by the air from the reservoir and which tend to restrict the passages in or connected with the trap and by preference we form the choke passage in a separable fitting screwing into the trap and delivering air to the expansion chamber from which the second restricted passage in turn leads.

Our invention will be best understood as described in connection with the drawing, which is a central longitudinal vertical section through a trap embodying our improvements, and in which, A indicates a sand supply pipe; B the sand retaining bowl of the trap; C an outlet passage from the upper portion of the bowl communicating with a delivery passage, indicated at D. E indicates a passage for air connectible with a pipe leading from an air distributing valve. As shown in our former patent, this opening communicates through a chamber F with the outer nozzle G, through which, as described in our prior patent, a short jet of air is injected into the delivery pipe to clean it out at the beginning of the sanding operation.

H indicates a separable fitting screwing in an opening in the top of the sand trap and provided with a choke passage, indicated at I. Around the upper end of this choke passage we preferably form a depressed gutter, as indicated at J. The choke passage I opens into an expansion chamber formed in the wall of the trap and indicated at K and from this expansion chamber leads a restricted passage L, provided, as shown, with means for regulating its effective area, which is conveniently a needle valve M, as shown in the drawing. As shown, and by preference, this restricted passage L opens directly into a second expansion chamber N, from which in turn leads an air nozzle directed into the bowl of the trap, as indicated at O. As shown, and, by preference, this second expansion chamber has also leading from it a second air nozzle P, directed like the clean out nozzle into the delivery outlet of the trap.

In operation, the air coming from the supply pipe enters the trap through the choke passage I, passing with considerable velocity into the expansion chamber K, in which its velocity is again converted into pressure but considerably less in amount than that existing in the supply pipe. The air from the expansion chamber K then passes through the preferably regulable restricted passage L, the effective area of which is controlled by the needle valve M and from this passage the air passes through the nozzle O into the bowl of the trap, preferably first passing into the second expansion chamber N, in which again the velocity of the air passing from the regulable restricted passage L is converted into pressure and from which second expansion chamber N we prefer to lead a portion of the air into the nozzle P, which supplies a jet of air directed into the delivery pipe D, which materially assists in the transportation of the sand and which also has a function in preventing or modifying the tendency of the sand issuing from the bowl to strike against the end wall of the trap. The construction which we have described we have found to materially aid in securing an air jet for delivering sand from the bowl which will have both the proper velocity and the proper volume for delivering a regulable quantity of sand. The construction functions better than previous constructions under considerable variations of pressure in the reservoir and supply pipe and requires less frequent adjustments of the needle valve.

Having now described our invention, what we claim as new and desire to secure by Letters Patent, is:

1. In a sand trap having a sand retaining bowl adapted to be connected with a source of sand supply and a sand delivery passage connected with the upper portion of said bowl, means for injecting a jet of air into the bowl portion of the trap and for regulating and controlling the amount and velocity of the air delivered into the trap, consisting of a choke passage adapted to be connected to the air supply pipe of the sander system, an air expansion chamber formed in the wall of the trap into which said choke passage opens, a restricted passage opening from said air expansion chamber, an air delivery nozzle directed into the bowl of the trap and connected with said last mentioned restricted passage.

2. A sand trap having the features of claim 1, in which a second air expansion chamber is located between the second restricted passage and the nozzle.

3. A sand trap having the features of claim 1, in which a second air expansion chamber is located between the second restricted passage and the air nozzle directed into the bowl of the trap and in which said second expansion chamber is connected also to a nozzle directed into the delivery outlet of the trap.

4. A sand trap having the features of claim 1, in which the end of the choke passage into which the air enters is surrounded by a depressed gutter adapted to catch and retain any particles of dirt or the like carried by the air supply connected with the choke passage.

5. A sand trap having the features of claim 1, in which the choke passage is formed in a separate fitting screwing into the trap and registering with the first expansion chamber.

6. In a sand trap having a sand retaining bowl adapted to be connected with a source of sand supply and a sand delivery passage connected with the upper portion of said bowl, means for injecting a jet of air into the bowl portion of the trap and for regulating and controlling the amount and velocity of the air delivered into the trap, consisting of a choke passage adapted to be connected to the air supply pipe of the sander system, an air expansion chamber formed in the wall of the trap into which said choke passage opens, a restricted passage opening from said air expansion chamber, an air delivery nozzle directed into the bowl of the trap and connected with said last mentioned restricted passage and adjustable means for varying the effective cross sectional area of the second restricted passage.

7. A sand trap having the features of claim 6, in which a second air expansion chamber is located between the second restricted passage and the nozzle.

8. A sand trap having the features of claim 6, in which a second air expansion chamber is located between the second restricted passage and the air nozzle directed into the bowl of the trap and in which said second expansion chamber is connected also to a nozzle directed into the delivery outlet of the trap.

9. A sand trap having the features of claim 6, in which the end of the choke passage into which the air enters is surrounded by a depressed gutter adapted to catch and retain any particles of dirt or the like carried by the air supply connected with the choke passage.

10. A sand trap having the features of claim 6, in which the choke passage is formed in a separate fitting screwing into the trap and registering with the first expansion chamber.

RALPH A. LIGHT.
JOSEPH W. PRICE, Jr.